United States Patent
Morton et al.

(10) Patent No.: US 9,507,715 B2
(45) Date of Patent: Nov. 29, 2016

(54) COHERENCY PROBE WITH LINK OR DOMAIN INDICATOR

(71) Applicant: Advanced Micro Devices, Inc., Sunnyvale, CA (US)

(72) Inventors: Eric Morton, Austin, TX (US); Patrick Conway, Los Altos, CA (US); Elizabeth Morrow Cooper, Los Gatos, CA (US); Vydhyanathan Kalyanasundharam, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 68 days.

(21) Appl. No.: 14/523,045

(22) Filed: Oct. 24, 2014

(65) Prior Publication Data

US 2016/0117248 A1    Apr. 28, 2016

(51) Int. Cl.
*G06F 12/08* (2016.01)
*G06F 11/34* (2006.01)
*G06F 11/30* (2006.01)

(52) U.S. Cl.
CPC ....... *G06F 12/0815* (2013.01); *G06F 11/3037* (2013.01); *G06F 11/3409* (2013.01); *G06F 2212/604* (2013.01)

(58) Field of Classification Search
CPC .......... G06F 12/0815; G06F 11/3037; G06F 11/3409
USPC ................................................. 711/141, 146
See application file for complete search history.

(56) References Cited

U.S. PATENT DOCUMENTS

| | | | |
|---|---|---|---|
| 7,337,279 B2* | 2/2008 | Glasco ................ | G06F 12/0817 711/100 |
| 8,195,887 B2* | 6/2012 | Hughes ................ | G06F 1/3203 711/135 |
| 2002/0009095 A1* | 1/2002 | Van Doren ....... | G06F 15/17393 370/432 |

* cited by examiner

*Primary Examiner* — Pierre-Michel Bataille

(57) ABSTRACT

A processor includes a set of processing modules, each of the processing modules including a cache and a coherency manager that keeps track of the memory addresses of data stored at the caches of other processing modules. In response to its local cache requesting access to a particular memory address or other triggering event, the coherency manager generates a coherency probe. In the event that the generated coherency probe is targeted to multiple processing modules, the coherency manager includes a set of multicast bits indicating the processing modules whose caches include copies of the data targeted by the multicast probe. A transport switch that connects the processing module to the fabric communicates the coherency probe only to subset of processing modules indicated by the multicast bits.

16 Claims, 4 Drawing Sheets

US 9,507,715 B2

COHERENCY PROBE WITH LINK OR DOMAIN INDICATOR

BACKGROUND

Field of the Disclosure

The present disclosure relates generally to processors and more particular to memory coherency for processors.

Description of the Related Art

As processors have scaled in performance, they have increasingly employed multiple processing elements, such as multiple processor cores, multiple processing units (e.g., one or more central processing units integrated with one or more graphics processing units), and the like. To enhance processing efficiency, reduce power, and provide for small device footprints, a processor typically employs a memory hierarchy wherein the multiple processing elements share a common system memory and are each is connected to one or more dedicated memory units (e.g., one or more caches). The processor enforces a memory coherency protocol to ensure that different processing elements do not concurrently modify data assigned to a shared memory location at their respective dedicated memory units. To comply with the memory coherency protocol, the processing elements transmit coherency messages (i.e., coherency probes and probe responses) over a communication fabric of the processor. However, in processors with a large number of processing elements, the relatively high number of coherency messages can consume an undesirably large portion of the communication fabric bandwidth, thereby increasing the power consumption and reducing the efficiency of the processor.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate techniques for reducing the number of coherency probes communicated over a fabric of a processor by communicating multicast probes only to a select subset of the processor's processing modules. Each of the processing modules includes a cache and a coherency manager that keeps track of the memory addresses of data stored at the caches of other processing modules. In response to its local cache requesting access to a particular memory address or other triggering event, the coherency manager generates a coherency probe. For a coherency probe targeted to multiple processing modules (referred to as a multicast probe), the coherency manager includes a set of multicast bits indicating the processing modules whose caches include copies of the data targeted by the multicast probe. A transport switch that connects the processing module to the fabric communicates the coherency probe only to subset of processing modules indicated by the multicast bits. The processor thus reduces the number of coherency probes communicated over the fabric, improving communication bandwidth.

In some embodiments, each bit of the multicast bits corresponds to a different link, wherein each link connects a portion of processor to a different portion. For example, the processor may be configured as a multi-chip module (MCM), with each chip in the MCM including multiple processing modules, and with each chip connected to one or more of the other chips via corresponding links. Each multicast coherency probe is sent only via the links indicated by asserted ones of the multicast bits, thereby reducing the number of coherency probes sent over MCM links. In some embodiments, some of the multicast bits can correspond to different domains of the processor. For example, the processor can include different caching domains (e.g., one or more CPU cache domains and one or more GPU cache domains), and the multicast bits are employed to ensure that cache probes are communicated only to designated ones of the different domains.

Figure 1:
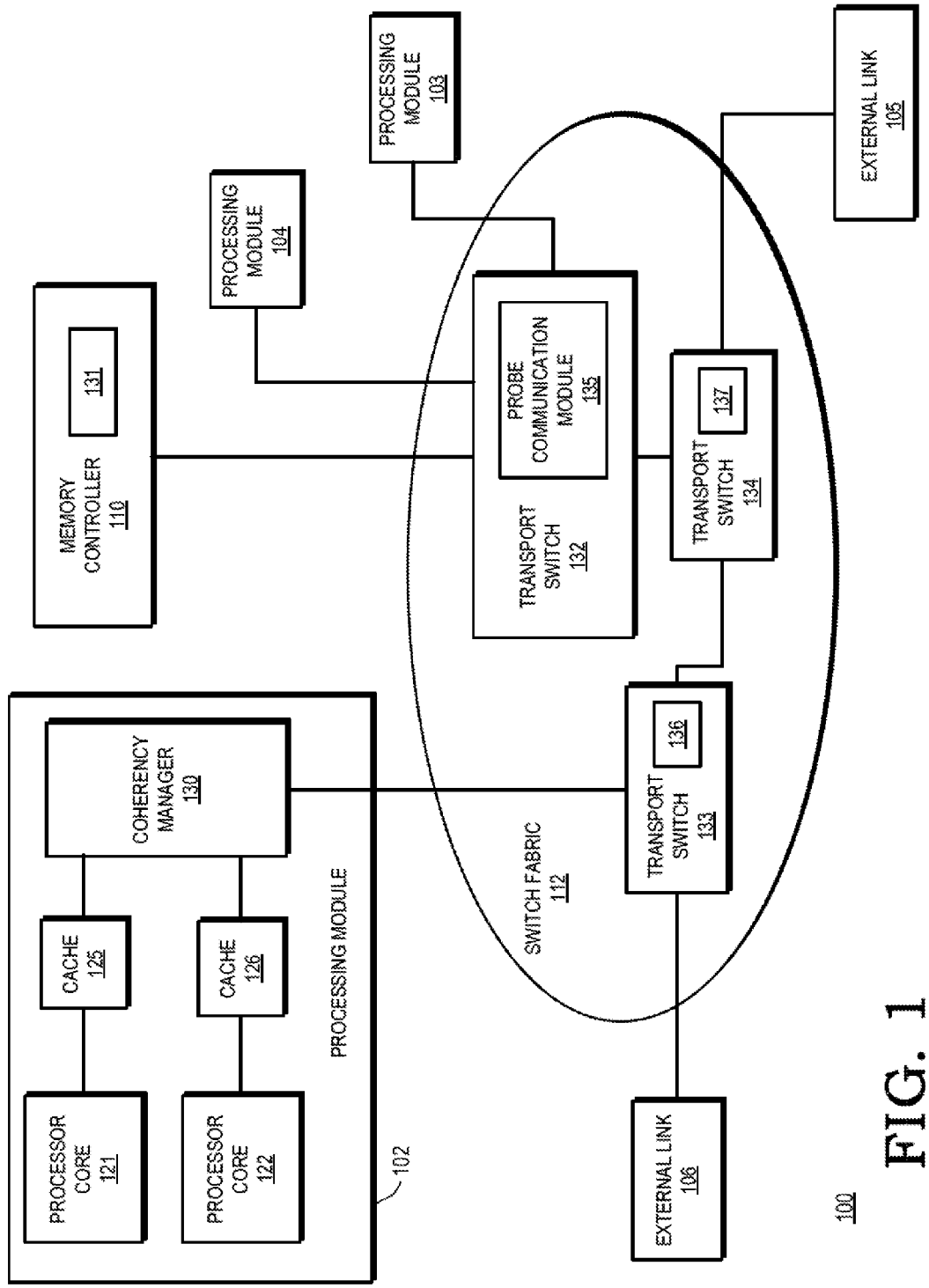
FIG. 1 is a block diagram of a processor in accordance with some embodiments.

FIG. 1 illustrates a block diagram of a processor 100 in accordance with some embodiments. The processor 100 includes processing modules 102, 103, and 104, external links 105 and 106, a memory controller 110, and a switch fabric 112. In some embodiments, the processor 100 is packaged in a multichip module format, wherein the processing modules 102-104 and the memory controller 110 are each formed on one integrated circuit die, other processing modules and memory controllers packaged on different dies, and then the dies, with the external links 105 and 106 forming connections between the dies. The processor 100 is generally configured to be incorporated into an electronic device, and to execute sets of instructions (e.g., computer programs, apps, and the like) to perform tasks on behalf of the electronic device. Examples of electronic devices that can incorporate the processor 100 include desktop or laptop computers, servers, tablets, game consoles, compute-enabled mobile phones, and the like.

The memory controller 110 is connected to one or more memory modules (not shown) that collectively form the system memory for the processor 100. The memory controller 110 can be connected to any of a variety of memory types, including random access memory (RAM), flash memory, and the like, or a combination thereof. The memory modules include multiple memory locations, with each memory location associated with a different memory address.

The switch fabric 112 is a communication fabric that routes messages between the processing modules 102-104, and between the processing modules 102-104 and the memory controller 110. Examples of messages communicated over the switching fabric 112 can include memory access requests (e.g., load and store operations) to the memory controller 110, status updates and data transfers between the processing modules 102-104, and coherency probes and coherency probe responses (sometimes referred to herein simply as "probe responses"). To facilitate communication, the switch fabric includes a set of transport switches, such as transport switches 132, 133, and 134 in the illustrated embodiment. Each transport switch is generally configured to receive messages from its connected modules (e.g., from a processing module, external link, or other transport switch) and route each message to another of its connected modules based on an address of the message. Messages can thereby be routed from a source module to a destination module through a series of hops between transport switches of the switch fabric 112.

The processing module 102 includes processor cores 121 and 122, caches 125 and 126, and a coherency manager 130. The processing modules 102-104 include similar elements as the processing module 102. In some embodiments, different processing modules can include different elements, including different numbers of processor cores, different numbers of caches, and the like. Further, in some embodiments the processor cores or other elements of different processing modules can be configured or designed for different purposes. For example, in some embodiments the processing module 102 is designed and configured as a central processing unit to execute general purpose instructions for the processor 100 while the processing module 102 is designed and configured as a graphics processing unit to perform graphics processing for the processor 100. In addition, it will be appreciated that although for purposes of description the processing module 102 is illustrated as including a single dedicated cache for each of the processor cores 121 and 122, in some embodiments the processing modules can include additional caches, including one or more caches shared between processor cores, arranged in a cache hierarchy.

Each of the processing modules 102-104 includes a coherency manager (e.g., coherency manager 130 of processing module 102) and the coherency managers together enforce the coherency protocol for the processor 100. The coherency protocol is a set of rules that ensure that a processor core does not have read or write access to a memory location or cache line at their respective dedicated cache while another processor core is modifying that data at its dedicated cache. For purposes of description, the processor 100 implements the MOESIF protocol. However, it will be appreciated that in some embodiments the processor 100 can implement other coherency protocols, such as the MOESI protocol, the MESI protocol, the MOSI protocol and the like. In the illustrated example of FIG. 1, the memory controller 110 includes a coherency manager 131 that can perform similar functions to the coherency managers of the processing modules 102-104. In some embodiments, the coherency manager 131 performs all coherency operations on behalf of the processing modules 102-104, and the individual processing modules 102-104 do not include separate coherency managers.

In some embodiments, each of the processing modules 102-104 may be grouped into one or more coherency domains, wherein each coherency domain maintains memory coherency within the domain but coherency is not maintained between coherency domains. In some embodiments, data can be shared between the domains, even if coherency is not maintained between the domains. To illustrate, in some embodiments the processing modules 102 and 103 are central processing units (CPUs) grouped into one domain (the CPU domain) and the processing module 104 is a graphics processing unit (GPU) grouped into a different domain (the GPU domain). Data can be shared between the CPU domain and the GPU domain. However, while memory coherency is maintained within the CPU domain, and within the GPU domain, memory coherency is not maintained between the CPU and GPU domains.

For purposes of description, an element of a processing module that can seek to access data associated with a particular memory location of the memory controller 110 is referred to as a coherency agent. The coherency protocol defines a set of coherency states and the rules for how data associated with a particular memory location of the memory controller 110 is to be treated by a coherency agent based on the coherency state of the data at each of the processing modules 102-104. To illustrate, different ones of the processing modules 102-104 can attempt to store, at their local caches, data associated with a common memory location of the memory controller 110. The coherency protocol establishes the rules, within a given domain, for whether multiple coherency agents can keep copies of data corresponding to the same memory location at their local caches, which coherency agent can modify the data, and the like.

To enforce the coherency protocol, the coherency managers of the processing modules 102-104 exchange messages, referred to as coherency messages, via the switch fabric 112. Coherency messages fall into one of at least two general types: coherency probes that seeks the coherency state of data associated with a particular memory location at one or more of the processing modules 102-104, and probe responses that indicate the coherency state, transfer data in response to a probe, or provide other information in response to a coherency probe. To illustrate via an example, the coherency manager 130 can monitor memory access requests issued by the processor cores 121 and 122. In response to a memory access request to retrieve data from a memory location of the memory controller 110, the coherency manager 131 can issue a coherency probe to each of the processing modules 102-104 requesting the coherency state for the requested data at the caches of each module. The coherency managers at each of the processing modules 102-104 receive the coherency probes, identify which (if any) of their local caches stores the data, identify which domain(s) cache this memory location, and identify the coherency state of each cache location that stores the data. The coherency managers generate probe responses to communicate the coherency states for the cache locations that store the data, together with any other responsive information. The coherency manager 130 keeps track of the coherency state, by memory address or other indicia, of data stored at its local caches 125 and 126. In some embodiments, the coherency manager 130 can also maintain information the coherency state for other processing modules within its domain that share data associated with particular memory addresses. In some embodiments the requesting coherency agent includes information about the coherency state for the other processing modules within its domain.

In some embodiments, the coherency probes generated by the coherency manager 131 can be either of at least three different types, indicating the number of processing modules targeted by the probe: broadcast coherency probes, targeted to all other processing modules of the processor 100, multicast coherency probes, targeted to a subset of the other processing modules, and unicast coherency probes, targeted to a single one of the other processing modules. As used herein, a subset of processing modules is defined as more than one, but fewer than all, of the processing modules that did not generate the coherency probe (that is, more than one, but fewer than all of the processing modules that could be targeted by the coherency probe). The type of coherency probe generated by the coherency manager 130 can depend on the coherency state of the memory location targeted by the probe. For example, for memory locations identified as being in a shared, forward, or owned state, the coherency manager 130 can generate a multicast probe. For memory locations identified as being in another state, such as a modified state, the coherency manager can generate a unicast probe or a broadcast probe.

For multicast probes, the coherency manager 131 identifies which of the processing modules 102-104, has at least one cache that stores data targeted by the probe. In addition, the coherency manager 131 identifies which processing modules connected to the switch fabric 112 via the external links 105 and 106 have at least one cache that stores data targeted by the probe. The identified processing modules are referred to for purposes of description as the targeted processing modules, and the processing modules that do not have at least one cache that stores data targeted by the probe are referred to as untargeted processing modules. The coherency manager 130 forms the multicast probe to include a field that identifies the targeted processing modules and provides the multicast probe to the transport switch 132.

The transport switch 132 includes a probe communication module 135 that receives coherency probes and directs the coherency probes to one or more of its connected processing modules 103-104. In particular, in response to receiving a multicast coherency probe the probe communication module 135 identifies, based on routing algorithms and the multicast bits, the targeted processing modules. It then identifies which of its ports are connected to a targeted processing module. The probe communication module 135 then communicates the coherency probe, via the switching fabric 112 only to those ports connected to a targeted processing modules. In contrast, a conventional transport switch would communicate all multicast or broadcast coherency probes to all processing modules, even those that do not have a cache that stores data targeted by the probe. By communicating the multicast or broadcast coherency probe only to a subset of processing modules (the targeted processing modules) the probe communication module 135 reduces the overall number of coherency probes communicated via the switch fabric 112, thereby improving overall communication bandwidth for other messages.

The transport switches 133 and 134 include probe communication modules 136 and 137, respectively. Each of the probe communication modules 136 and 137 operate similarly to the probe communication module 135 with respect to their connected processing modules and external links. In some embodiments, the coherency manager 131 identifies only untargeted processing modules connected via an external links. Thus, a multicast coherency probe generated by the coherency manager 131 is communicated to all of the processing modules 102-104, but includes multicast bits that identify only a subset of the external links. The probe communication modules 136 and 137 ensure that the coherency probe is only communicated to the links indicated by the multicast bits. In some embodiments, the multicast bits of a coherency probe can indicate both individual processing modules and external links, and the probe communication modules 135-137 together ensure that the coherency probe is communicated only to those individual processing modules and links indicated by the multicast bits. In some embodiments, each multicast bit corresponds to a different cache domain, and the probe communication modules 135-137 together ensure that the coherency probe is communicated only to the processing modules in the one or more domains indicated by the multicast bits.

In response to receiving a broadcast coherency probe, the probe communication module 135 can communicate the probe to all of the other processing modules 102-104 and to the external links 105 and 106. In response to receiving a unicast coherency probe, the probe communication module 135 can communicate the probe to the one of the other processing modules 102-104 or the external links 105 and 106 targeted by the probe.

In order to ensure that it has complete information to determine the coherency state for data to be fetched, the coherency manager 131 keeps track of the umber of responses received to each of the coherency probes it issues, and determines the coherency state for data only after it has received all responses. In some embodiments, when it issues a coherency probe the coherency manager 131 sets a response count value to a threshold number equal to the number of other processing modules 102-104 and the number of processing modules connected via the external links 105 and 106. For multicast probes that are not sent to all processing modules, each coherency manager at the processing modules can send information indicating how many processing modules were omitted by the multicast probe. The coherency manager 131 uses this received information to adjust the response count value. When the response count value reaches a designated threshold, the coherency manager 131 determines that it has received all expected responses to the coherency probe.

Figure 2:
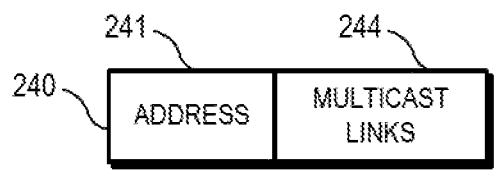
FIG. 2 is a block diagram of a probe filter used at the processor of FIG. 1 in accordance with some embodiments.

FIG. 2 illustrates a block diagram of a multicast coherency probe 240 (sometimes referred to simply as a "multicast probe") that can be generated by the coherency manager 130 in accordance with some embodiments. The multicast probe 240 includes an address field 241 that indicates the memory address targeted by the coherency probe, and a multicast links field 242 that stores information indicating the subset of processing modules targeted by the probe. In some embodiments, the multicast links field is a set of bits, with each bit corresponding to a different one of the other processing modules. In some embodiments, each bit can correspond to a link between sets of processing modules, such as a link between dies in a multichip module. In some embodiments, each bit can correspond to a different caching domain in a processor. A bit in a specified state (e.g., an asserted state) indicates that the multicast probe 240 is to be sent to the corresponding processing module, link, or cache domain. A bit in a different specified state (e.g., a negated state) indicates that the multicast probe 240 is not to be sent to the corresponding processing module, link, or cache domain.

Figure 3:
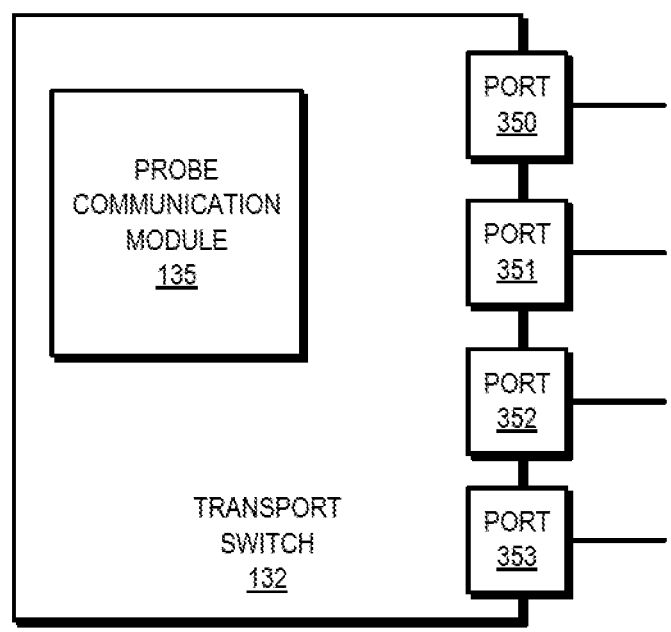
FIG. 3 is a diagram of a transport switch of FIG. 1 in accordance with some embodiments.

FIG. 3 illustrates a block diagram of the transport switch 132 of FIG. 1 in accordance with some embodiments. In the illustrated example, the transport switch 132 includes ports 350, 351, 352, 353, and 354. Each of the ports is connected to the switch fabric 112 to communicate to a corresponding one of the other processing modules or external link. Thus, for example all messages to be communicated to the processing module 102 are communicated by the transport switch 132 via the port 350, all messages to be communicated to the processing module 103 are communicated via the port 351, and all messages to be communicated to an external link (not shown) are communicated via the port 352. In response to receiving a multicast coherency probe, the probe communication module 135 identifies the subset of processing modules targeted by the probe, and communicates the coherency probe only via those ports corresponding to the targeted subset of processing modules. To illustrate using the example multicast coherency probe 240 of FIG. 2, each bit of the multicast links field 242 corresponds to one of the bits of the ports 350-354. In response to receiving the multicast probe 240, the probe communication module 135 identifies the asserted bits of the multicast links field 242, and communicates the coherency probe only via those ports corresponding to asserted bits.

Figure 4:
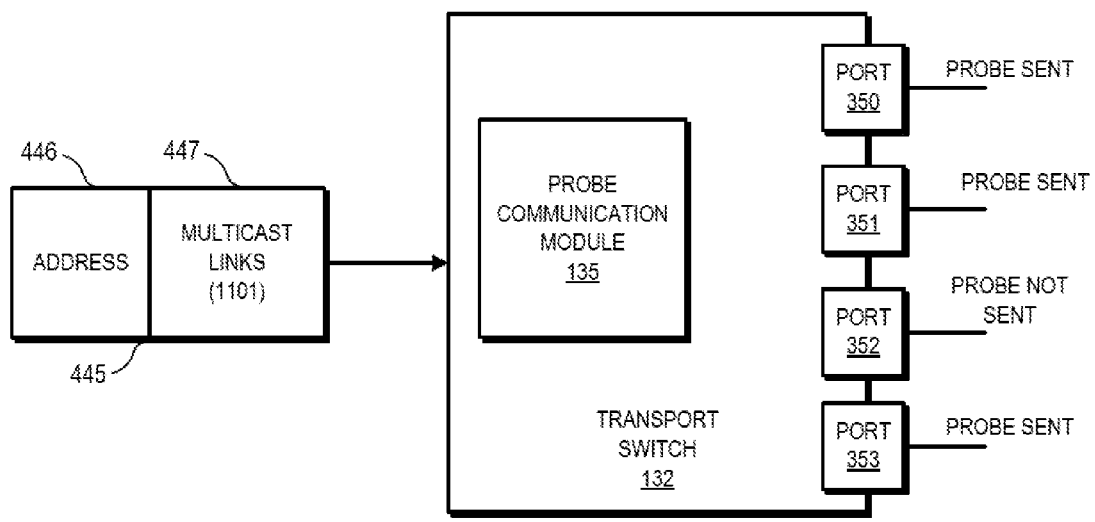
FIG. 4 is a diagram illustrating communication of a coherency probe to a subset of ports of the transport switch of FIG. 3 in accordance with some embodiments.

FIG. 4 illustrates an example operation of the transport switch 132 in response to receiving a multicast coherency probe 445 in accordance with some embodiments. The multicast coherency probe 445 includes an address field 446 and a multicast links field 447, similar to the multicast probe 240 of FIG. 2. In the illustrated example, the multicast links field 447 is set to the value 1101, indicating that the coherency probe 445 is targeted to the processing modules and external links corresponding to ports 350, 351, and 353, but is not targeted to the processing module corresponding to port 352. Accordingly, in response to receiving the multicast coherency probe 445, the probe communication module 135 sends the probe to ports 350, 351, and 353, but does not send the probe to port 352.

Figure 5:
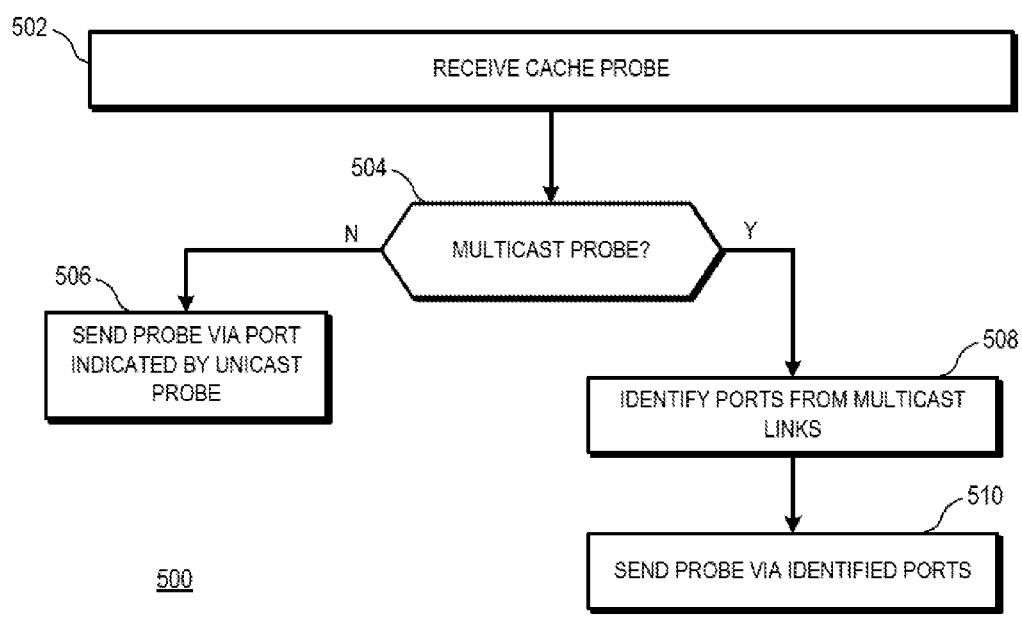
FIG. 5 is a flow diagram of a method of communicating a coherency probe to a subset of links in accordance with some embodiments.

FIG. 5 is a flow diagram of a method 500 of communicating a cache probe at the transport switch 132 of FIG. 1 in accordance with some embodiments. At block 502 the transport switch 132 receives a cache probe. The probe communication module 135 determines, based on a field of the probe, whether the received cache probe is a multicast probe or a unicast probe. If the cache probe is a unicast probe, the method flow moves to block 506 and the probe communication module 135 sends the probe via the port of the transport switch 132 that corresponds to the processing module targeted by the unicast probe.

Returning to block 504, if the received cache probe is a multicast probe, the method flow moves to block 508 and the probe communication module 135 identifies, based on the multicast links field of the coherency probe, the ports corresponding to the subset of processing modules targeted by the received cache probe. At block 510, the probe communication module 135 provides the probe only to those ports identified by the multicast links field, thereby reducing the number of coherency probes communicated via the switch fabric 112.

Figure 6:
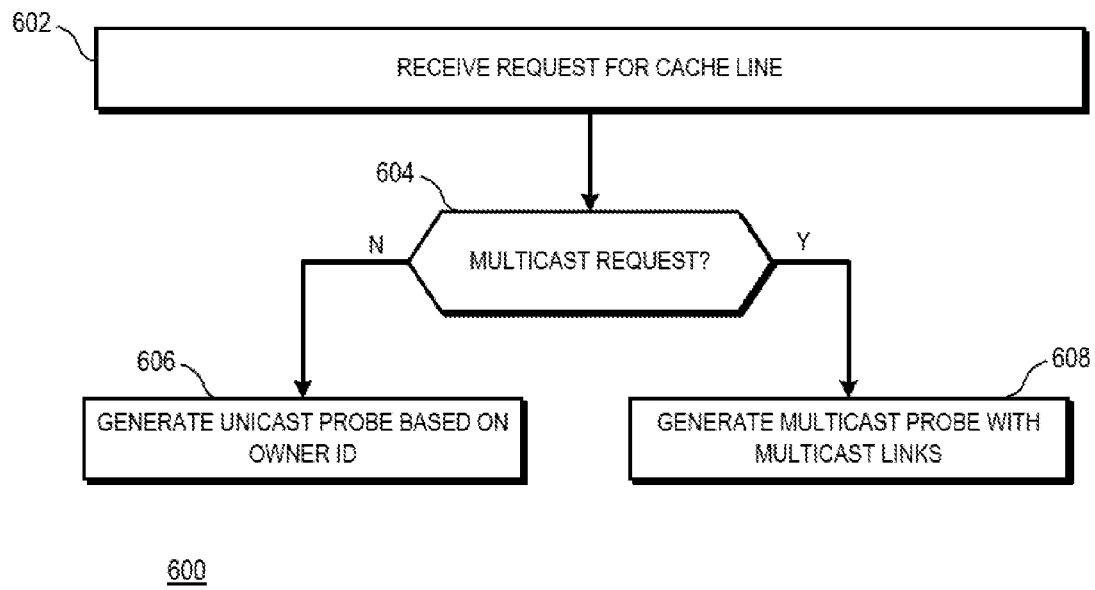
FIG. 6 is a flow diagram of a method of generating multicast and unicast coherency probes in accordance with some embodiments.

FIG. 6 is a flow diagram of a method 600 of generating a coherency probe at the coherency manager 130 in accordance with some embodiments. At block 602 the coherency manager 130 receives a request to fetch a cache line associated with a memory address indicated in the request. At block 604 the coherency manager 130 determines, based on a coherency state associated with the memory address, whether the probe to be generated is a multicast probe or a unicast probe. For example, in response to the coherency state being a shared, forward, or owned state, the coherency manager 130 can determine that the probe to be generated is a multicast probe and, in response to the coherency state being an exclusive state, the coherency manager 130 can generate a unicast probe.

If the probe to be generated is a unicast probe, the method flow moves to block 606 and the coherency manager 130 generates a unicast probe targeted to, for example, the processing module indicated as the owner of the cache line corresponding to the memory address. If, at block 604, the method flow moves to block 608 and the coherency manager 130 determines that the coherency probe to be generated is a multicast probe, the coherency manager 130 identified subset of processing modules that have a copy of the cache line corresponding to the memory address. The coherency manager 130 generates a multicast coherency probe having a multicast links field with asserted bits corresponding to the identified subset of processing modules, and provides the generated multicast coherency probe to the switch fabric 112 for communication.

In some embodiments, the apparatus and techniques described above are implemented in a system comprising one or more integrated circuit (IC) devices (also referred to as integrated circuit packages or microchips), such as the processor described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 7:
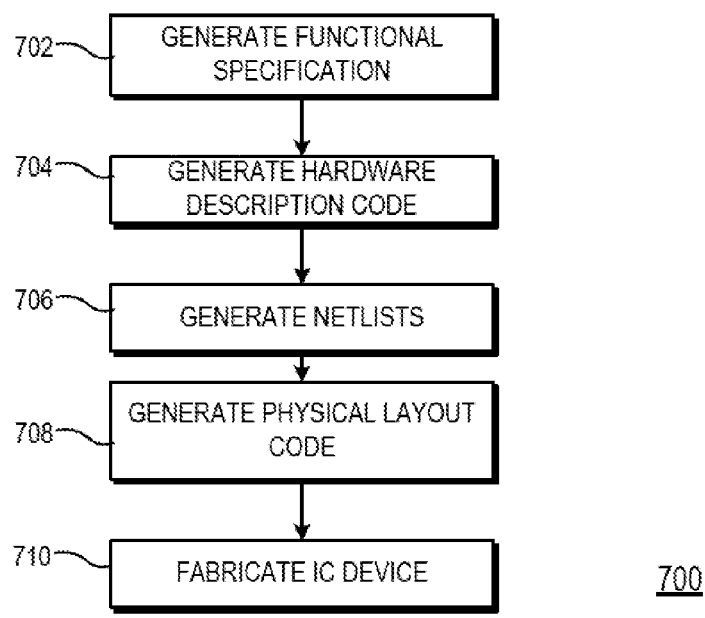
FIG. 7 is a flow diagram illustrating a method for designing and fabricating an integrated circuit device implementing at least a portion of a component of a processing system in accordance with some embodiments.

FIG. 7 is a flow diagram illustrating an example method 700 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 702 a functional specification for the IC device is generated. The functional specification (often referred to as a micro architecture specification (MAS)) may be represented by any of a variety of programming languages or modeling languages, including C, C++, SystemC, Simulink, or MATLAB.

At block 704, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 706 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 708, one or more EDA tools use the netlists produced at block 706 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist (s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 710, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   identifying a first coherency probe as a multicast probe based on a coherency state of a memory address corresponding to the first coherency probe;
   in response to receiving the first coherency probe at a processing module of a processor and in response to identifying that the first coherency probe is a multicast probe:
      identifying a subset of a plurality of processing modules of the processor based on a field of the coherency probe, the subset of the plurality of processing modules including more than one processing module; and
      communicating the coherency probe to the identified subset of the plurality of processing modules; and
   in response to receiving a second coherency probe at the processing module and in response to identifying that the second coherency probe is a unicast probe, communicating the second coherency probe to a single processing module of the plurality of processing modules.

2. The method of claim 1, wherein identifying the subset of the plurality of processing modules comprises identifying the subset at a transport switch of the processing module.

3. The method of claim 2, wherein identifying the subset of the plurality of processing modules comprises identifying a subset of a plurality of ports of the transport switch, each of the subset of ports corresponding to a different one of the plurality of processing modules.

4. The method of claim 3, further comprising communicating the first coherency probe via the identified subset of ports of the transport switch.

5. The method of claim 1, further comprising generating the first coherency probe to include the field in response to identifying the coherency probe as a multicast coherency probe.

6. The method of claim 1, wherein the subset of processing modules comprises a subset of processing modules corresponding to a link between dies of a multichip module.

7. A method, comprising:
identifying a first coherency probe as a multicast probe based on a coherency state of a first memory address corresponding to the first coherency probe;
in response to a request at a first processing module of a processor for a coherency state for the first memory address and in response to identifying the first coherency probe as a multicast probe, generating the first coherency probe to have a field indicating a subset of a plurality of processing modules of the processor to which the first coherency probe is to be communicated.

8. The method of claim 7, further comprising:
at a transport switch of the processor, communicating the first coherency probe to the subset of the plurality of processing modules based on the field of the first coherency probe.

9. The method of claim 8, wherein communicating the first coherency probe comprises:
identifying a subset of ports at the transport switch based on the field of the first coherency probe; and
communicating the first coherency probe via the identified subset of ports.

10. The method of claim 7, wherein the coherency state of the first memory address is one of a shared state, an owned state, and a forward state.

11. The method of claim 7, further comprising:
in response to a request at the first processing module of a processor for a coherency state for a second memory address, generating a second coherency probe and communicating the second coherency probe to all of the plurality of processing modules.

12. A processor, comprising:
a first processing module to generate a first coherency probe;
a plurality of processing modules coupled to the first processing module; and
wherein the first processing module is to:
identify the first coherency probe as a multicast probe based on a coherency state of a memory address corresponding to the first coherency probe; and
in response to identifying the first coherency probe as a multicast probe, communicate the first coherency probe to a subset of the plurality of processing modules based on a field of the first coherency probe identifying the subset.

13. The processor of claim 12, wherein the first processing module comprises:
a transport switch coupled to a communication fabric of the processor, the transport switch to identify the subset of the plurality of processing modules.

14. The processor of claim 13, wherein:
the transport switch comprises a plurality of ports coupled to the communication fabric, and wherein the transport switch identifies the subset of the plurality of processing modules comprises by identifying a subset of the plurality of ports.

15. The processor of claim 14, wherein:
the transport switch communicates the coherency probe via the identified subset of ports.

16. The processor of claim 12, wherein:
the first processing module is to generate a second coherency probe and to communicate the second coherency probe to a selected one of the plurality of processing modules.

* * * * *